United States Patent [19]
Barsellotti et al.

[11] 3,935,396
[45] Jan. 27, 1976

[54] KEY TELEPHONE SYSTEM USING TIME DIVISION AND SPACE DIVISION CONTROL

[75] Inventors: John A. Barsellotti; Joseph H. McNeilly; Federico R. Laliccia, all of Guelph, Canada; Edouard Pinede, Norwalk, Conn.

[73] Assignee: International Standard Electric Corporation, New York, N.Y.

[22] Filed: Jan. 23, 1975

[21] Appl. No.: 543,479

Related U.S. Application Data

[63] Continuation of Ser. No. 362,915, May 23, 1973, abandoned.

[30] Foreign Application Priority Data
May 23, 1972 Canada.................................. 142792

[52] U.S. Cl.................................. 179/99; 179/18 J
[51] Int. Cl.² ............................................ H04M 1/00
[58] Field of Search ... 179/99, 18 F, 18 FA, 15 AT, 179/18 J

[56] References Cited
UNITED STATES PATENTS

| | | | |
|---|---|---|---|
| 3,244,815 | 4/1966 | Anderson et al. | 179/99 |
| 3,385,935 | 5/1968 | Anderson et al. | 179/99 |
| 3,420,961 | 1/1969 | Averill, Jr. | 179/99 |
| 3,549,820 | 12/1970 | Knollman | 179/99 |
| 3,604,857 | 9/1971 | Opferman | 179/99 |
| 3,745,256 | 7/1973 | Carbrey | 179/15 AT |
| 3,789,152 | 1/1974 | Medill et al. | 179/18 J |

Primary Examiner—Kathleen Claffy
Assistant Examiner—Gerald L. Brigance
Attorney, Agent, or Firm—James B. Raden; Marvin M. Chaban

[57] ABSTRACT

Disclosed is a key telephone system using a line concentrator and a form of TDM signalling. A single data and supervisory control pair of wires connects a station instrument to the system to effect all switching and supervisory controls for all lines to which the station has access, regardless of the number of these lines. Each station instrument also has a pair of speech wires which are switched within a station-line matrix under the control of a memory unit as directed by the data transmitted. Lines are grouped into groupings of up to five lines accessible to each station, there being a matrix and memory for controlling the switching of the matrix within each grouping. More than five lines may be accessible from a station instrument, such instrument having connections to multiple groups through a station circuit individual to that station. Within the system, many added features, such as speech pair security, restrictions on allowed service, and the like may be readily incorporated.

7 Claims, 10 Drawing Figures

KEY TELEPHONE SYSTEM USING TIME DIVISION AND SPACE DIVISION CONTROL

This is a continuation, of application Ser. No. 362,915 filed 5/23/73 now abandoned.

BACKGROUND OF THE INVENTION

As is well known, key telephone systems are used where a particular telephone station instrument or subset is to have the capability of direct access or connection to a plurality of lines or trunks included within the key system. In the older systems, this capability is attained by terminating all the line conductors for each of these lines directly at the station set and providing a key or button for each line. The particular lines to be used by the telephone station instrument is accessed by depressing the key for that line to directly connect the station instrument conductors to that line. An extra key is provided for placing a line in a hold condition when a second line is to be connected to the station instrument conductors to complete a call over the second line without disrupting the connection to the first line. Many other special services may also be provided, such as intercom, conference calling, priority levels, etc.

In the known systems, each line physically terminates directly at the station subset with its plurality of conductors so that as many as 50 conductors have to be cabled to a subset to control a standard six-button set, in which five buttons are utilized, one for each of five lines and the sixth button performs the hold control. For sets with greater number of line terminations, the number of conductors required may be particular multiples of the number of conductors required for a five line set.

In an attempt to reduce the number of these conductors, systems have been disclosed wherein only two speech conductors are actually connected to each station set, regardless of the number of buttons. In the known ones of these systems, at least four additional conductors are connected to the instrument for transmitting and receiving data to and from the station instrument to a line concentrator. Such systems frequently employ a central control which may be a data processor or computer, to cooperate with a concentrator in the form of a memory and a switching network to keep track of the states of the various lines and buttons and set up the connection through the network as required for key system operation.

Other known systems have been organized on a per line basis, with each line having two speech conductors, two data-in conductors and two data-out conductors. In one such known system, the conductors of each station have an appearance at one alignment on a crosspoint network, the trunks or lines having appearances along the other alignment. A control effects the switching of all conductors to complete a speech path and a signalling path through the crosspoint network.

SUMMARY OF THE INVENTION

The present invention comprises a key telephone system in which a subset may have access for direct connection to as few as five lines or even less if desired, (also called trunks herein), or to as many other lines as it is practical to provide, keeping in mind that a key or button must be provided at the station for each line. Regardless of the number of lines accessible from a station, only four conductors are required, two to provide the speech pair, the other two to provide a switching and supervisory control pair called herein a data pair.

With a system of the type shown herein, many new features may be added, features not generally available on key telephones, such as secured telephones, override, PABX recall, service restrictions and combinations of audible signalling.

The present invention uses a form of time division multiplex signalling with the signalling information coded on its signalling pair of conductors to control a space switching of the speech or voice pair. A computer or data processor could readily be used to control the system, the computer replacing certain of the central control circuits shown herein.

In the present system, five-line groups are used as the building blocks or modules. A station may have access to up to five lines by employing a single matrix module and access to lines in multiples of five lines. Information regarding the status of the lines is stored in a memory, the memory controlling the switching of the speech path between a station and a line in response to depression of the line key at that station.

The system, as shown, could be used in a number of ways. One way would be to use the system as a small capacity key system for example, at a small office, with less than five lines accessible at the few stations. Another way the system could be used would be to control a plurality of small key systems (up to 20 small systems) within a large PABX, as might be desired for a large factory having many internal departments. A still further approach available would be to provide a large system with ten to twenty lines available at some or all of the station sets.

It is, therefore, an object of this invention to provide a key telephone system which requires two speech conductors and only two data conductors terminating at each station set.

It is a further object of this invention to provide a key telecommunication system in which the particular ones and the number of lines accessible at each station may be varied greatly.

A still further object of this invention is to provide a key communication system in which only the speech pair of conductors is switched, the supervisory and switching control being performed by a time sharing or multiplexing of the lines and stations over a data pair of conductors.

It is still a further object of the invention to provide a telecommunication system using TDM principles to provide one or more key telephone groupings.

Other objects, features and advantages of the invention will become apparent from the following detailed description viewed in conjunction with the drawings described below.

DETAILED DESCRIPTION OF THE DRAWINGS

Figure 1:
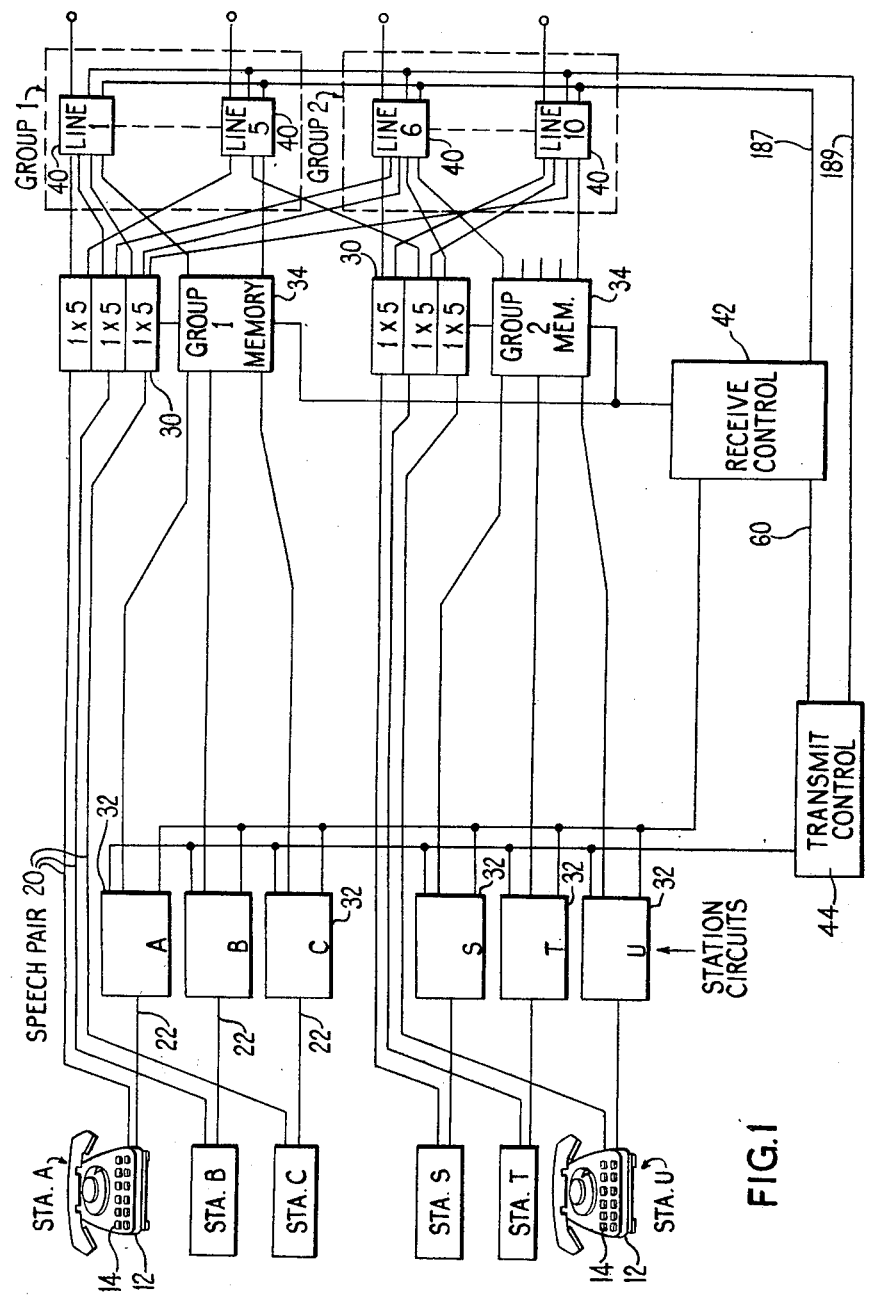
FIG. 1 is a simplified block diagram of a system employing our invention.

Some general comments regarding the operation of the system should be made before turning to the specific circuits disclosed.

It should be noted that each station subset has one button per line to which it has access plus functions buttons such as hold, exclusion and recall, and a bell control switch and suitable volume control. Associated with each line button is a visual indicator in the form of a suitable lamp or the like, which indicates the status of the line to the user — line busy, awaiting answer, hold, etc.

The exclusion button also has an associated visual indicator to show the security status of a call. This will be referred to as the non-secure warning lamp. The hold and recall buttons and the bell control switch do not require an associated visual indicator.

It is important to note that the line, hold, exclusion and recall buttons are all non-locking and in all cases require only momentary operation.

The steps in originating a call will now be noted briefly:

a. A station wishing to initiate a call goes off hook, lifting his handset.

b. He then visually extablishes that the desired line is free by noting that the lamp of the desired line is out. He then operates the line button.

By depression of the line button, the appropriate code is transmitted over the data pair from the station to the central control. The code information is then stored for that line. The line is now busy and this condition is indicated to all telephone stations that have access to that line by means of the line lamp being on. During the proper time slot interval, the speech pair is switched through from the calling station to the trunk represented by the depressed line button.

If the telephone station has previously been connected to another line, it would not have been necessary to go on-hook (hang-up) before originating a call on the new line. Upon operating the line button of the required line, any previous connection is automatically broken.

Further, if required, the line button may be operated before lifting the handset in order to facilitate operation of the instrument one-handed. By means of a memory in the control circuits, the required connection will be established if the handset is lifted within ten seconds of the line button operation.

It is not possible to connect a telephone station speech pair to more than one line at one time, except through the use of conferencing equipment (which is not within the scope of the invention shown herein).

On an incoming call, the call is indicated by a flashing lamp at all telephone stations that have access to that line, i.e., if the call is on line 3 then line lamp 3 will flash at all stations that have access to line 3, at the rate of ½ second on, ½ second off.

An audible signal is generated at those stations having their audible signalling receiver set to signal on incoming calls, as is well known in the art in principle.

To answer a call, the handset is picked up and the line button of the calling line is depressed. Upon answer, the calling condition changes to a busy condition (steady lamp and no audible signals).

To hold a line at a station while the same station is to be used for a call on another line, the hold button is activated. This very-well-known feature is used where the station wishes to make a consultation call either on another line, or by means of the intercom internally to call another telephone within the key system, or to answer an incoming call on another line, or to transfer that call to another station within the key system. In any of these events, the hold facility is activated by operation of the hold button. The line to which the station had been connected immediately prior to the actuation of the hold button will automatically go into the hold condition and the connection between the station and that line is broken. The telephone is now free to be used for any other normal purpose, as indicated previously.

The held line condition is indicated by a visual signal in the form of a "wink off" every ½ second, for a wink duration of approximately 50 msec. Thus, if line 2 is on hold then line lamp 2 will "wink off" every ½ second at all stations having access to line 2. A "wink off" signal is defined as a lamp interruption of approximately 50 msec., with the lamp being normally on.

Any telephone that has access to the held line may connect to it, cancelling the hold condition, by following exactly the same procedure used for originating a call. From the foregoing, it can be seen that call transfer simply involves informing the appropriate person to pick-up the held line. Any one call may be placed on hold for consultation or transfer as many times as required. Any one station can be used to place any or all of the lines appearing at that station onto hold.

In general, switching and supervisory control is effected by half-duplex data transmission between subset and central control (receive and transmit control) to convey from the subset the information regarding the state of the line buttons and the function buttons such as HOLD, RECALL, EXCLUSION, CONFERENCE, etc. Information is sent to the subset to control the condition of the line lamps, exclusion lamp, and to operate the two audible signal generators.

The function and operation of the speech and dialling path remains the same as that of the ordinary telephone.

The central control (which includes the receive and transmit control circuits) transmits a 16 bit word to each subset accessible to a line grouping, the data being in diphase code. The first 8 bits comprise the address for a particular five line group in the subset, and the second 8 are the lamp and audible indications for that group. Having received this information successfully, the subset transmits a 16 bit word which is a highly redundant code based on 8 bits derived from scanning the state of the push buttons. The central control, on receipt of this information, decodes it and updates the appropriate memory elements. The memory for each grouping of five lines in the system is scanned in this way once every 100 msec.

It is worth noting that it is more important to detect errors in the signal transmitted from the subset than in that sent to it. The former can change the status of a call whereas the latter merely changes a lamp indication for a period of 100 msec. Information to be transmitted from the subset is initially set up as an 8 bit word. The status of the five line buttons is coded in 2 out of 4 code. The state of the hookswitch is conveyed by digit 5. The six permissible code combinations of digits 6, 7 and 8 convey the state of the other buttons, such as hold and recall, etc. Pushing two or more buttons at the same time will set up a nonpermissible code which will be detected by the central control. The 8 bits are then transmitted as 16 bits in a highly redundant code.

In transmission from the control to the subset it is important that the address of the five lines in the grouping is correctly received. The chance of error in this address is minimized by again using a highly redundant code. The maximum number of five line groupings per subset is arbitrarily limited to 16. A counter in the subset is updated each time a grouping of five lines is interrogated and the state of the counter must coincide with the received address, otherwise transmission is inhibited. This counter is synchronized to the first grouping of five lines by a unique address code.

All data received by the subset is checked to ensure that the information received has been properly coded in diphase code, as will be explained more fully. As far as the information to operate the lamps is concerned, a simple diphase code check is the only check that is made. If an address or other code error is detected in any of the information received then the entire information is rejected — no attempt is made to correct errors.

Turning now to the drawings, in FIG. 1, we show a block diagram of a system employing our invention. Shown there are a plurality of station instruments 12, six of which are shown (two in greater detail). Each station instrument has line and function push buttons or keys 14, preferably being of the type which are translucent and each of which has a lamp, or preferably a light emitting diode, visible through the translucent button body (as is well known). The push buttons 14 are of the nonlocking type and each, on depression thereof, momentarily closes a pair of contacts, as will be described in detail later. Each such station instrument also has the usual station elements such as receiver, transmitter, dial and hookswitch in conjunction with its speech path conductors.

While we have shown in FIG. 1 stations which have access to five or less lines, the principle shown herein is applicable with stations having access to as many as thirty lines, as will be described. The usual number of lines accessible at one station would include at least one line button for each line to which the station has access, in addition to having function or supervisory buttons.

As can be seen with respect to station C in FIG. 1, each station has two pairs of conductors; one a speech pair 20 and the other the data pair 22. The speech pair from each station terminates at an appearance on one alignment of a crosspoint matrix 30, there being one matrix 30 for each grouping of five lines to which that subset has access. The data pair 22 terminates at a station circuit 32, individual to that station instrument. From the station circuit 32, a pair of data conductors is connected to a group memory 34, there being a separate group memory for each grouping of five lines accessible from a station. For each such five line grouping, the group memory 34 controls the functioning of the matrix.

Each matrix 30 comprises a crosspoint arrangement along one alignment of which appear the speech pairs from the station instruments and along the other alignment within the matrix are individual speech pair appearances for each line or trunk unit 40 to which that subset has direct access. Along one alignment of each matrix, there are a maximum of five line appearances, and along the other alignment are positioned connections to one station for each 1×5 matrix unit. At each crosspoint, there may be any suitable switching member, such as a reed relay switch, silicon controlled rectifier, or the like, reed relay being shown herein. In addition, each matrix has digital circuitry to decode information from its memory group.

As mentioned above, the matrices are comprised of basic 1×5 units. In a basic unit, one station has access to five lines. If two stations are to have access to the five lines, then two basic units must be employed to provide for the ten possible choices available. In the circuit of FIG. 1, three stations are shown having access to the five line groups 1 and 2, thus, each group must have three 1×5 matrices to provide for the possible connections. As shown in FIG. 1, Station A is shown having access to lines 1 and 5, Station B has access to lines 1 and 6, and Station C to lines 1, 6 and 10. In Group 2, Station S has access to lines 6 and 10, Station T to lines 5 and 10, and Station U to line 10 only.

The firing, or operation, of each crosspoint is determined by the memory 34 for the same line grouping. Shown in FIG. 1 are two groups labeled Group No. 1 and Group No. 2, each group having five lines or trunks 40 connected thereto. The memory 34 includes a plurality of memory elements, arranged in groups of five. Each memory group is related to a grouping of specific lines in a subset. The number of memory groups related to a subset forms a memory circuit. The memory stores the information regarding the address and connection of any line of any subset to a trunk circuit, and controls the matrix and activates the trunk circuits accordingly.

Within the group memories, every memory element is scanned sequentially from the control during a frame period. The memory element includes a latch, with some auxiliary gating to provide correct time sharing inputs and outputs. It can be set from the control only during its own time slot, and cleared — either from the control or from the station circuit — during the active period of the memory circuit to which it belongs. The memory provides a steady output to the matrix element (group binary code may be used to decrease the number of connections) and a time shared output signal to the prewired trunk circuit.

The five memory elements of a memory grouping represent directly the five lines accessible from a particular subset. Each memory element consists of a latch and associated gating elements to control the "SET" and "RESET" of the latch, as will be described later relative to FIG. 8.

The output from the latch drives a relay, only via a buffer stage. Also, the latch output is gated with the memory element scanner to provide the trunk triggering signal. The relay will be operated as long as the associated latch is in the "SET" condition. The appropriate one of the five latches is operated from the control when a request for the particular line is received from the subset.

Common to the key system disclosed is a receive control unit 42 and a transmit control 44. These units are tied into the lines (trunks), memory and station circuits by means of bus lines to the three groups of circuits.

In addition, a scanner sequentially enables each of the memory elements of the system and within a group of five memory elements also enables the appropriate station circuit. The resultant output from the memory elements triggers the line (or trunk) to which it is connected.

The trunk thus triggered will send data to the transmit control which data is representative of the status of that trunk. When the transmit control has received from the five trunks (maximum) of the group, the status of the five trunks is transmitted to the station circuits. The station circuit identified by the scanner will transmit this data to the subset.

The subset responds by transmitting data representative of the buttons and hook switch status to the receive control via the station circuit identified by the scanner.

The memory element scanner now scans the same five memory elements again. During this second scan the control may update the memory. Also during this scan the memory output is restricted to the active memory element (one maximum) only. Thus, only the trunk to which the subset is switched is triggered at this time.

The trunk thus triggered is enabled to receive data from the receive control. This data contains the hook switch status of the connected subset and command codes such as HOLD, SECURITY STATUS, etc.

From the foregoing, it can be seen that the grouping of up to five lines accessible to a station is the keystone of the system. Groupings of the lines also determine the number and groupings of the memory units and matrix units. Within the subset, circuits are organized into five line modules, a single module sufficing if only five lines are to have access to a station.

Figure 9:
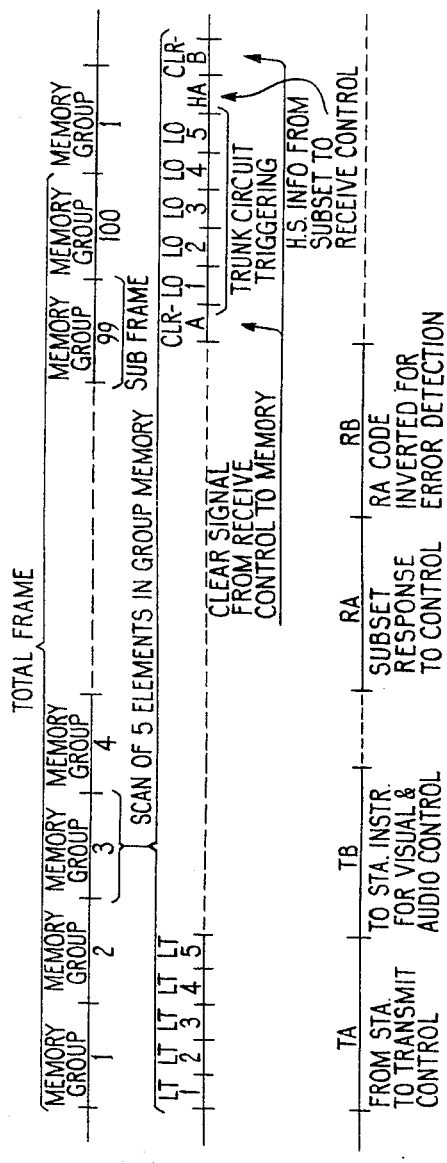
FIG. 9 is a timing chart to aid in understanding the operation of the disclosed system.

Turning from the description of the specific apparatus shown in FIG. 1, it may be advisable to next view briefly the general multiplexing sequence for the system, as viewed best in FIG. 9. In the multiplexing chart of FIG. 9, we show a frame comprised of up to 100 memory groups, each memory group, as mentioned previously, representing five lines or trunks 40. Each such memory group comprises a sub-frame within the timing network. Each sub-frame includes a plurality of time slots, each such slot being set out in the intermediate line of FIG. 9. The slots are each capable of processing eight bits of information. At the start of each sub-frame there appears, in sequence, a time slot for each of the lines appearing in that group. Next, there appear some supervisory slots, followed by a second appearance for each line of that group, followed by slots representing other supervisory or control functions.

Concurrent with each sub-frame is a series of lesser duration timing slots for controlling the transfer of data within the system. Thus, during the concurrence of signals in a time slot representing a line of a group and representing a particular control function, the indicated transfer of control will be effected for that line. The functioning of this system will be described further in this specification.

Figure 2:
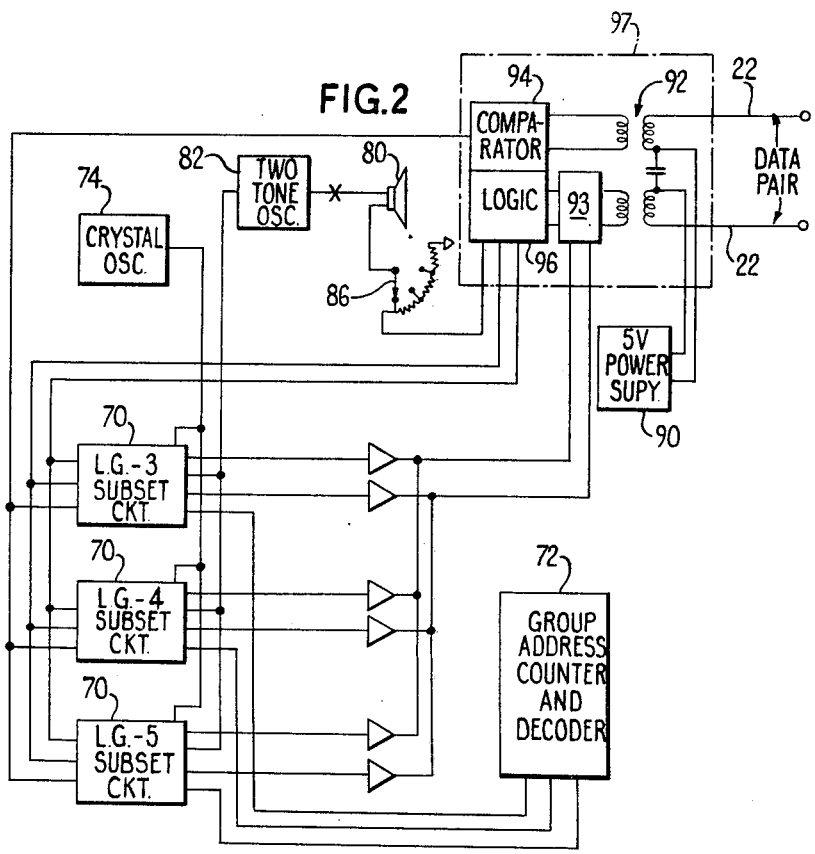
FIG. 2 is a block diagram, in greater detail, of an exemplary Subset Circuit of FIG. 1.

In FIG. 2, we show the control circuitry at a typical station instrument or subset 12. The station instrument is shown with three groupings of five lines being accessible from the station instrument; thus the station instrument, equipped with the circuitry of FIG. 2, (and suitable buttons, etc.), would be accessible to or connectable to a maximum of fifteen lines.

To provide this number of lines, there are provided three separate line group subset circuits 70, these feeding data into a group address counter and decoder 72. Where a station only had access to a single group of five lines, only one line group subset circuit 70 would be required, and group address counter 72 could be deleted. Address counter 72 provides the following functions:

1. Finding the correct line group addressed; and
2. Combining audible and security signals for the subset.

Within each station instrument there is a crystal oscillator 74 feeding the subset circuits and through the subset circuits the group address counter 72. All crystal oscillators are set to the same basic frequency.

The instruction to initiate the tone caller in the subset is sent over the data pair as one of two possible codes, A or B. Trunk lines may be programmed at the central equipment to sent out only code A or only code B (or both) depending on the users requirement.

The subsets have a 3-position switch which controls which signal the subset will respond to: A only, B only, or either A or B. Thus, a line which is programmed to send out signal A only will not cause ringing at a subset with the switch in position B. If that subset has access to that line, then only the lamp indication will be displayed.

The station instrument also has an audible signalling speaker 80 driven by a two-tone oscillator 82. A volume control 86 allows the volume to be set.

The input and output to the station circuit is over the data pair 22 which receives, in addition to the signalling and supervisory control data, power in the form of 50 volt DC from the station circuit 32. Within the station circuit, a DC converter or power supply 90 provides suitable 5 volt bias for powering the internal station circuits.

Input data received on data pair 22 is transmitted through transformer 92 to a comparator 94 connected to one transformer secondary and logic 96. The other transformer secondary is connected to line driver 93 which is inserted between the subset circuits 70 and logic 96.

As can be seen, each of the line group circuits has direct connections through line driver 93 to the data pair to receive information directly and to process that information, as will be described more fully relative to FIG. 7.

Line driver 93 is a tri-state differential line driver used for feeding the diphase signal onto the line. This is done via a simple RC low pass filter which has the function of reducing near-end crosstalk.

The line receiver 93, comparator 94 and logic 96 comprise two differential voltage comparators connected to the line in parallel. One is offset to detect only signals greater than the preset level. The output from the zero crossing detector is then sampled at the appropriate rate determined by the timing generator. Eight successive bits of true diphase must be received before the subset control updates the counter to the next line group; otherwise the signal is disregarded. In this way, noise spikes and bursts of noise during the standby period will not upset the system.

The crystal oscillator 74 operates at approximately 1 MHz to provide the basic timing. The arrival of a signal in excess of the threshold of the offset comparator 94 switches the oscillator output into a divider chain. Decoded outputs from the divider provide signals for the various logic functions in the subset.

The diphase signal is comprised of one cycle of 70 KHz for a logical 1 and one ½ cycle of 35 KHz for a logical zero. The received signal must, therefore, be sampled at 140 KHz, the first sampling pulse occurring some 14 microseconds after the offset comparator is triggered. This ensures sampling in the middle of each time slot. The use of the relatively high basic clock rate means that variation in the position of the sampling pulse is not more than 1 microsecond.

Figure 3:
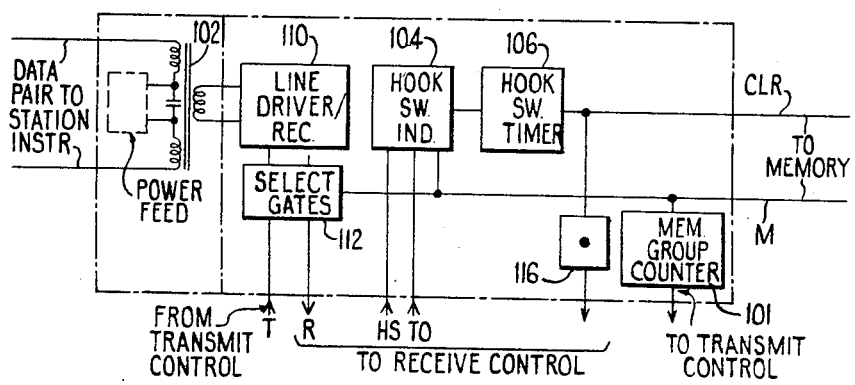
FIG. 3 is a block diagram of a Station Circuit of FIG. 1.

In FIG. 3, we show a block schematic diagram of a station circuit 32. Each station circuit is directly connected to its own individual matrix switching control memory 34 circuit through a data pair 22. The station circuit 32 is basically an interface between the subset 12 and the central control, and includes three main blocks, each one performing a particular function.

These blocks are:

1. The "Line Coupler," which contains the line driver and receiver 110, and allows the transmission of information between the subset and the control circuitry. It also supplies the power for the subset over the transmission leads 111.

2. The "Hook Switch Timer 106," which receives information from the control, and has the function of clearing the memory circuit and allowing the prime-line-pick-up mode of operation.

3. The "Memory Group Counter 101," which updates the subset on the particular line group to be processed.

The station circuit is used to provide power for the station subset circuits over the data pair as previously described. The station circuit provides overload protection and, as previously mentioned, power for control circuitory, lamp illumination and audible signalling by means of a tone at the subset. The station circuit provides a hook switch memory and an address code counter or memory group counter 101. The hook switch memory is comprised of two components, a hook switch detection or indicator circuit 104, and a timing counter 106.

The station circuit 32 has a single isolation coil 102 which is configured so that the signalling input to the coil from the station instrument must be of sufficient amplitude or the signal will not be processed by the central control. Feeding the coil 102 is a line driver and receiver 110 acting through select gates 112, the select gates controlling the two signalling conductors.

In addition, there are shown gating member 116. Gate member 116 is responsive to the hook switch control and will clear the memory after a timed period of non-operation of the hook switch with no other activity at the station which has gone on-hook.

Figure 4:
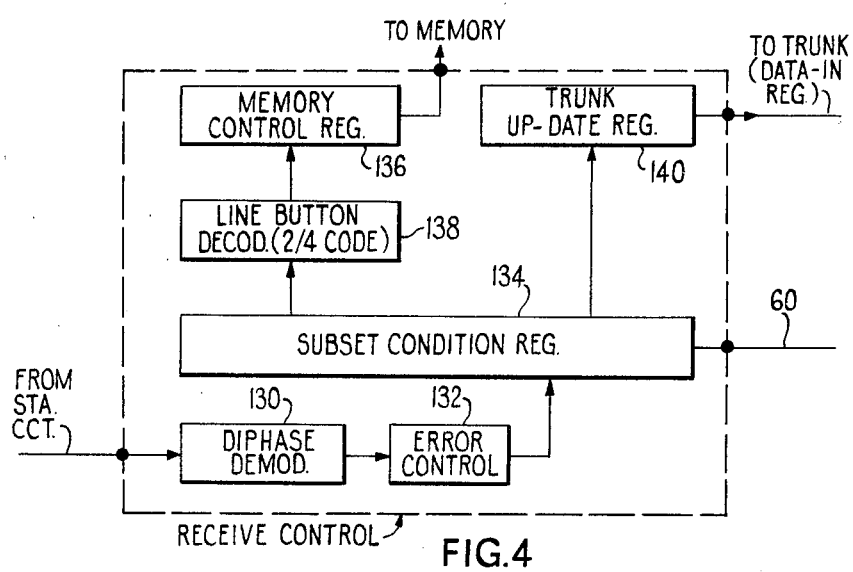
FIG. 4 is a block diagram of a Receive Control Circuit of FIG. 1.

In FIG. 4, we show a schematic block diagram of the receive control circuit 42. This circuit receives information from the station circuit in diphase code. The information received is demodulated in demodulator 130 and is transmitted through error control network 132 to the main subset condition register 134. The subset condition register stores information received from the subset. This information storage performs two functions. As to the first function, the register feeds the group memories through a memory control register 136, the memory controlling register performing the address function for controlling the transmission to the correct group memory. Input to the memory control register is through a decoder 138.

The second function of the subset condition register is to provide information to the data in register over bus 60 by way of the trunk update register 140. Thus, the circuit 42 receives coded information from the subset, stores this information and transmits it as necessary to the memory for matrix control and also provides information to the trunk.

The functions of receive control circuit 42 and transmit control circuit 44 could readily be programmed into a data processor or computer since the functions of these circuits are restricted to data processing functions.

Figure 5:
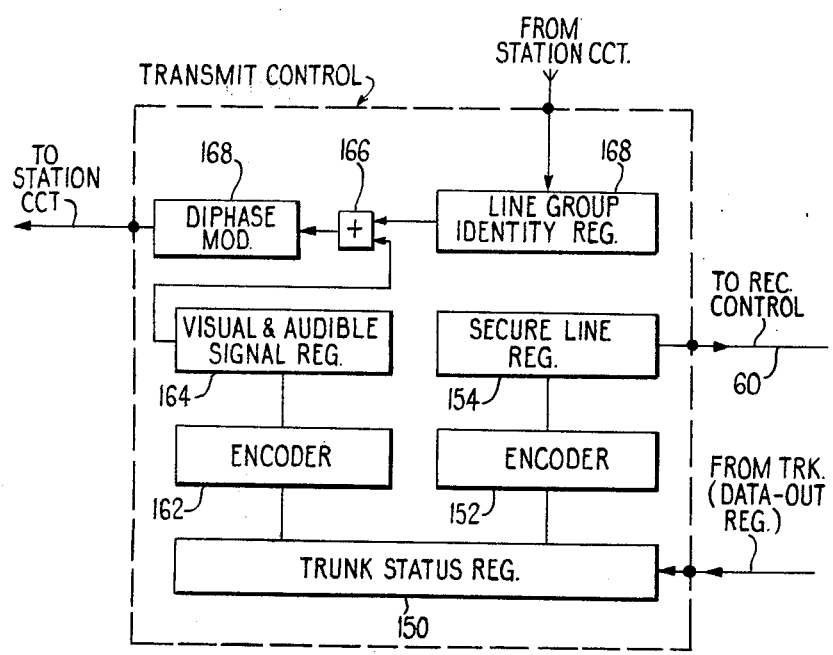
FIG. 5 is a block diagram of a Transmit Control Circuit of FIG. 1.

Transmit control circuit 44 is shown in block schematic form in FIG. 5. Data from the trunk or line is received in the trunk status register 150 and stored therein. Output from the trunk status register is fed in two directions.

Signals in a first direction pass over a path through encoder 152 and line status register 154 to the receive control over bus 60. The use of the line status register maintains a degree of security on the station to enable the station to control the ability of other stations to join the conversation on a speech path once switched through.

The second path from the trunk status register also passes through an encoder 162 to a visual and audible signal register 164 for transmission of information to the station circuit through gate 166 and diphase modulator 168. The gate circuit 166 also receives information from a line location identity register 168. This register 168 receives information from the station circuits to coordinate the transmission of information.

Figure 6:
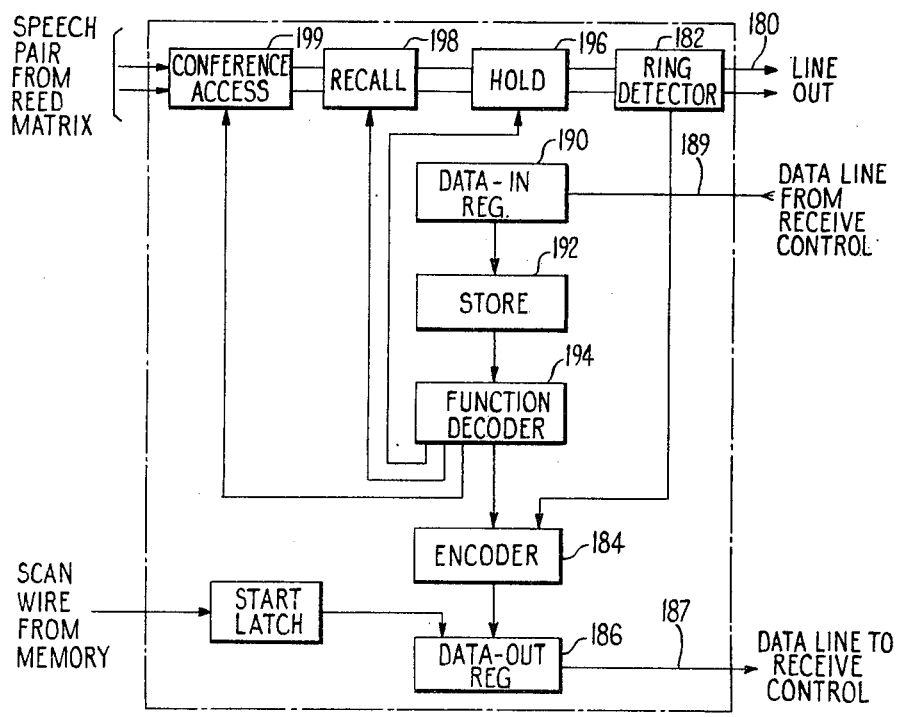
FIG. 6 is a block diagram of a Trunk Circuit of FIG. 1.

In FIG. 6, we show a block schematic of a trunk or line circuit 60. The term trunk or line used herein includes outside lines, conference circuits, intercom circuits and also includes other functional circuits such as junctors for special purposes. Each of these is treated in essentially the same way in attempting to signal and select stations and in being accessed from a station seeking service.

The sample trunk of FIG. 6 is used as a two-way line to a central office or the like. There are provided a pair of conductors referred to as 180, to provide the connection to the external office. These lines feed a ring detector 182.

Information from the ring detector is processed into the data or signalling system through encoder 184 and data out register 186 to the transmit control circuit 44 over conductor 187. This path is used to process data incoming into the key system of lead 186 to receive control circuit 42.

Information to be transmitted out of the system is received over data line 189 to the data in register 190 for transmission to memory store 192 and decoder 194. From the decoder this information is processed to either hold circuit 196, recall circuit 198 or conference access 199, depending on the particular functions to be achieved.

Figure 7A:
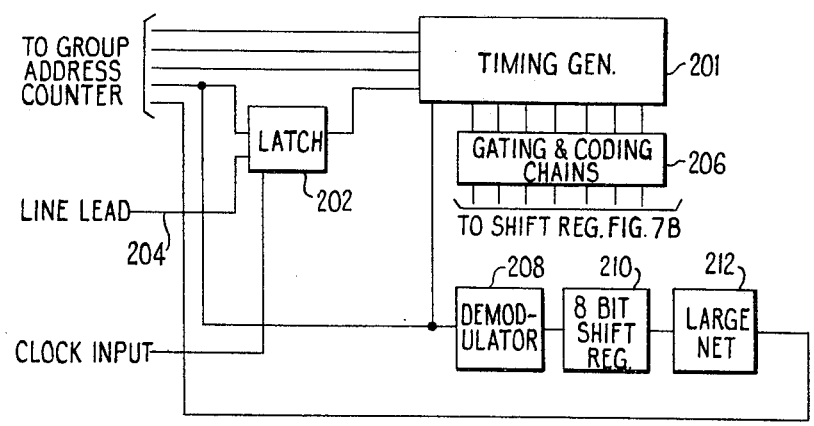
FIGS. 7a and 7b shows a more detailed showing of a representative Line Group Subset Circuit as shown in FIG. 2.
Figure 7B:
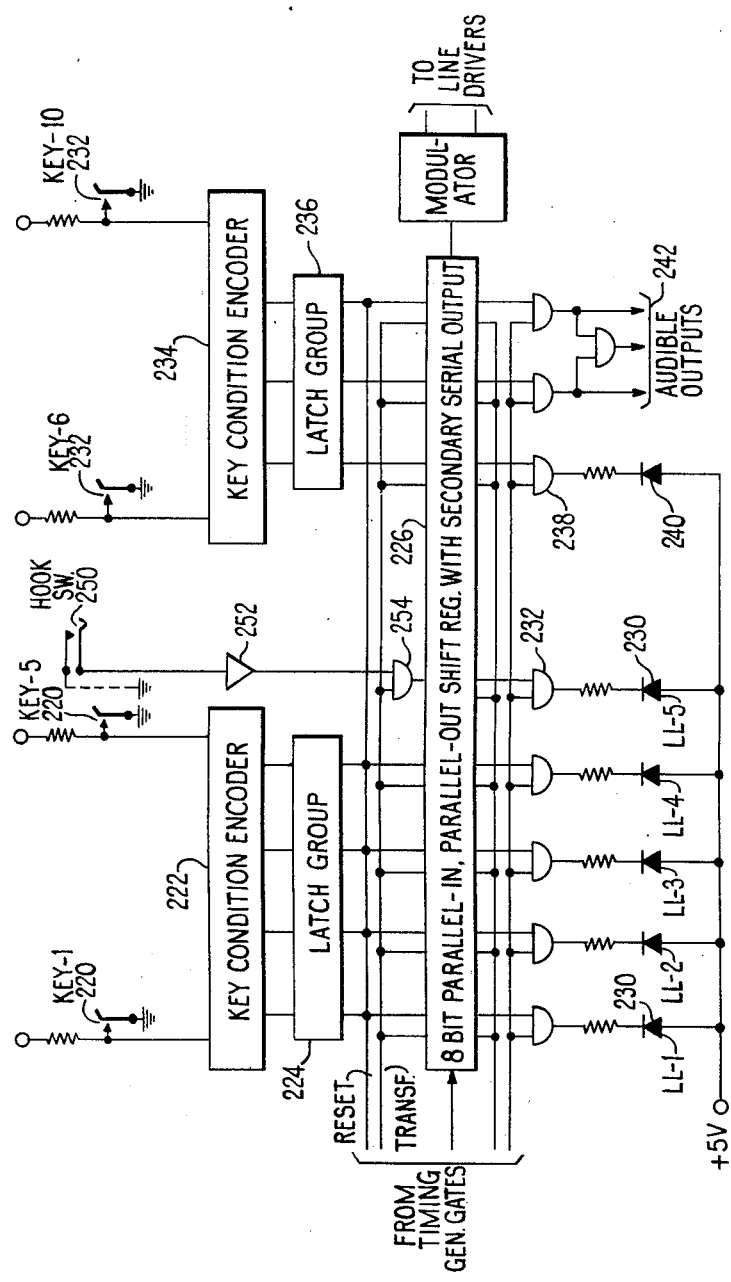

In FIG. 7, we show in greater detail the circuit within a line group subset circuit 70. The subset line group circuit can be broken into two general areas; the first being the generation of control signals as shown in FIG. 7A, and the response circuit to activate at the subset as indicated by FIG. 7B.

In FIG. 7A, we show a timing generator 201 which is normally inactive through the use of latch 202. Latch 202 has a connection to line data lead 204 to sense the presence of incoming information based on internal activity at the subset to trigger the timing generator 201 into activity.

The outputs of the timing generator are fed into various gating and coding chains 206 for use within the activity receiving circuit of FIG. 7B. A further output of the timing generator is fed through demodulator 208 in eight bit shift register 210 to a large network 212. The output of this large network is fed to a group address counter and is important only when more than one group is accessible at a specific subset.

In FIG. 7B, we show across one side of the figure, a plurality of keys totaling 10 in number, and a hook switch. As indicated, lines 1–5 each has its own line pickup key or button 220. The closure of a line key provides ground on a particular lead to a logic gating network performing as a key condition encoder 222 which feeds an eight bit latching arrangement generically referred to as latch group 224. From latch group 224, the encoded information is coordinated with information from the generator gating chain 206 and is further processed into an eight-bit parallel shift register 226.

Output of the shift register is dual in nature. Information is transmitted in a number of parallel outputs to control the line lamp 230 through individual AND gates 232. A similar arrangement is provided for the keys 6–10, which provide functions such as hold, security, recall and other desired services. These keys referred to generically as 232 also feed a key condition encoding network 234, latch group 236 and the register 226.

The parallel output of register 226 is processed through gates 238 to control security lamp 240 and audible signal leads 242. It should be noted that leads 242 may be connected to the oscillator 82 to control the audible output tone.

Also fed into the register 226 is hook switch information derived from the station hook switch 250 and processed through buffer 252 and gate 254.

The serial output of the register 226 is transmitted through diphase modulator 256 to data pair 22 and transmitted to the station circuits for processing.

Figure 8:
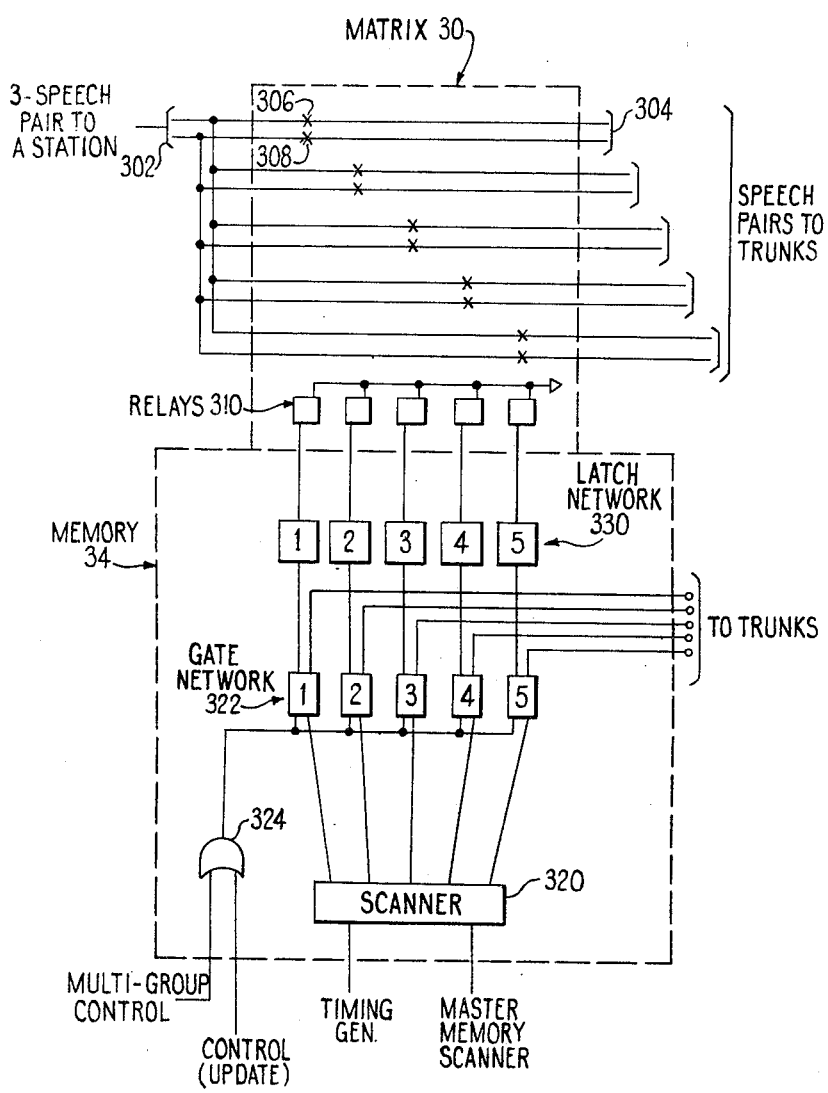
FIG. 8 is a more detailed showing of the memory and matrix units of FIG. 1.

In FIG. 8, we show schematically a 1×5 group matrix 30 with its memory 34. The switching matrix has at one end a pair of speech leads 302 to a station such as Station A. Within this matrix, the speech pair is connected in multiple to individual conductor pairs each of one trunk speech pair for each of the five trunks accessible from that station. Each trunk conductor pair such as 304, has a normally open contact set 306 and 308, one contact set for each conductor of the pair. Each pair of contact sets such as 306 and 308 is controlled by a relay 310 individual to that pair of contact sets. The trunk pairs are connected to the respective trunks 40 as shown in FIG. 1.

Within the control memory is a five position scanner 320 activated from the timing generator and from the control. The scanner actuates individual gate networks 322, one for each trunk. A further input-in multiple to the gate network inputs is connected from the output of an OR gate 324, the gate 324 having a multiple-group control input and a control update input. The gate networks each have two outputs, one to the trunk permanently associated therewith.

Another output from each gate network connects to a latch network 330 for the trunk pair, the latch networks controlling the operation of the respective speech pair control relays. Thus, each group scanner is actuated during its subframe, with the respective trunk appearances being scanned in sequence. A specific relay is activated during trunk triggering period (as will be explained more fully) to close the speech pair of that trunk.

Turning now to the multiplexing chart of FIG. 9, in greater detail we see the memory groups, up to one hundred in number, which make up a frame, the frames being successively recurring. The memory elements, five in number, within successive group memories 34 are scanned in the order shown.

The intermediate and lowest levels represent the segments of a frame, the frame having been selected being that designated as Memory Group 3, for example, as indicated by the brackets from Memory Group 3 in FIG. 9.

The intermediate level represents the period during which the information stored in memory 34 and the order in which the memory elements within the memory are scanned. Each memory element has an associated trunk which, when scanned, transfers eight bits of data. As the memory group is scanned, the first eight bits represent the status of line 1, the next line 2 . . . line 5. During the transfer control period designated as TA on the bottom line of FIG. 9, the trunk data LT1 – LT5 are scanned for nine possible conditions: (a) Incoming call, (b) Audible signal A, (c) Audible Signal B, (d) Busy, (e) Held, (f) Active, (g) Exclusion, (h) Parallel connection or (i) Secure line.

This data is assembled into a single eight bit code representing eight possible reactions: (a) Line lamp 1, (b) Line Lamp 2, (c) Line lamp 3, (d) Line lamp 4, (e) Line lamp 5, (f) Exclusion Lamp, (g) Audible signal A or (h) Audible signal B. The secure line information is transferred to the receive control to block access to that line.

During the transfer control period TB the last-mentioned code is transmitted to the station instruments within the key system regarding the line group just having been scanned to control the visual and audible signals at the station.

During the next extended transfer control period RA, information concerning the subset response is generated and sent to the receive control. This information is generated by the operation of a button at the subset as described relative to FIG. 7B. These information generating functions include the operation of one of five line buttons, the operation of the hook switch and the operation of any of the miscellaneous buttons - Hold, Exclusion, Recall or Conference.

In the coder of the subset, the information sent during period RA is inverted bit by bit and the inverted code is sent during transfer control period RB.

Following the end of the RB period, the line button operation detected in the receive control will send a clear signal to the memory during the first segment designated CLR-A of the action period. Following the clear signal the memory element scanner again scans the memory elements of the lines LO1–LO5 of Memory Group 3 being scanned. Resulting from this second memory element scan, if one element is active, the associated trunk is triggered by a signal through a gating controlled by the memory element involved. The trigger signal operates a latch in the trunk circuit to prepare the trunk circuit to receive data during the next or HA time slot. This information concerns the condition of the miscellaneous station buttons and the hook switch.

A final memory clear signal is sent in the CLR-B time slot. It is used to clear the memory group in such cases as trunk hold or conference access where it is necessary to send the appropriate code to the trunk (HA time slot) before breaking the connection. The memory group scanner now passes on to the next multiplexing memory group in the example noted.

The system has been explained as to general principles of operation and primarily through block diagrams in a manner considered to explain the system sufficiently for the general reference level of one skilled in the art.

The embodiments of the invention in which an exclusive property or privilege is claimed are definded as follows:

1. A time division key telephone system including a plurality of groups of key-equipped stations, a plurality of telephone lines and control apparatus for controlling the signalling of the condition of one of said lines to all stations of a group, the invention comprising: an individual station circuit for each of said stations, a pair of data conductors extending between each station and its station circuit for the bi-directional transfer of all control data to and from said station, a pair of speech conductors at each station, a switching network at said control apparatus terminating speech conductors from stations of said group for connection to one of said lines responsive to signals from said control apparatus, and network control means including latch means individual to each station, a memory element representing each such latch means, each said latch means responsive to signal data from a respective one of said station circuits for causing a memory element to store a condition of a station indicated by the latch means individual thereto, and means responsive to a scan of said memory elements for controlling the switching network to complete the connection of the speech conductors of said one station to a line.

2. A system as claimed in claim 1, wherein each said memory element also represents one station of each group, and in which there are means for scanning the elements of a group to determine the status of the station represented by the element, said scanning means operative to scan each of said elements of a group a second time to determine the status of each station.

3. A system as claimed in claim 2, wherein there is means for controlling a timed multiplex cycle, said cycle including a timed interval for each group of stations, and sub-intervals for the transfer of information.

4. A key telephone system using time division multiplexing for a group of stations having access to a telephone line, multiplex control means for transferring multiple bit signal control data sequentially to the plural stations of said group during one time interval and for sequentially transferring multiple bit signal data concerning the plural stations of said group during a second interval, means at each station for responding to conditions at said station and for encoding data representing said condition for transmission over a single data pair of conductors individual to said station to said control means during a third time interval, a speech pair of conductors coupled from each station to a switching network having access to said line, network control means operative responsive to signals received from a station during an interval allotted to that station for causing switching of said network to couple said station to said line.

5. A system as claimed in claim 4, wherein there are a plurality of groups of stations and a time period allotted to each of said groups of stations and in which there are means for scanning said network control means twice during each time period and in which there are group memory means for receiving and storing group connection data.

6. A key telephone system using time division multiplex signalling and comprising a plurality of telephone stations having access to a telephone line, switching means responsive to a closed loop condition at one station for closing a path from said station to said line, memory means for storing the condition of said stations and said line, scan means for scanning said memory for the condition of said line, means for transferring a multiple bit indication of said line status to control apparatus, means operative to transfer said multiple bit status indication from said apparatus to said one station over a data pair of conductors, means at said one station for sensing the response of said one station and for transferring multiple bit response information from said one station to said control over said data pair of conductors.

7. A system as claimed in claim 6, wherein said scan means is operated during a first sub-interval of the multiplex cycle, said transfer to said control apparatus of said data is completed during a second sub-interval spaced in time from said first interval, the transfer of data to said station occurring during a third sub-interval spaced in time from said second interval, and said transfer to said control is completed during a fourth sub-interval spaced in time from said third interval.

* * * * *